United States Patent [19]

Frey

[11] 4,088,910
[45] May 9, 1978

[54] GEARED MOTOR ASSEMBLY

[75] Inventor: Laverne Lawrence Frey, Delavan, Wis.

[73] Assignee: Bunker Ramo Corporation, Oak Brook, Ill.

[21] Appl. No.: 714,565

[22] Filed: Aug. 16, 1976

[51] Int. Cl.² .............................................. H02K 5/00
[52] U.S. Cl. ...................................... 310/89; 310/42; 310/83; 310/164
[58] Field of Search ....................... 310/42, 83, 43, 89, 310/91, 162, 163, 164, 165, 156, 172; 58/23 D

[56] References Cited

U.S. PATENT DOCUMENTS

| | | | |
|---|---|---|---|
| 3,059,131 | 10/1962 | Everard | 310/164 |
| 3,189,771 | 6/1965 | Danek | 310/164 |
| 3,268,751 | 8/1966 | Nebiolo | 310/162 |
| 3,447,008 | 5/1969 | Regner | 310/164 |
| 3,448,308 | 6/1969 | Murray | 310/162 |
| 3,452,228 | 6/1969 | Wooley | 310/83 |
| 3,558,940 | 1/1972 | Chestnut | 310/83 |
| 3,676,725 | 7/1972 | Wiser | 310/83 |
| 3,711,732 | 1/1973 | Gerber | 310/162 |
| 3,800,175 | 3/1974 | Plotscher | 310/164 |
| 3,859,548 | 1/1975 | Morley | 310/164 |

Primary Examiner—R. Skudy
Attorney, Agent, or Firm—F. M. Arbuckle; J. Isaac

[57] ABSTRACT

Synchronous motor has molded coil spool enclosed in telescoping metal field cups which have interdigitating teeth forming pole pieces around the central opening in the spool. A closed end of the spool has a bearing for one end of a shaft carrying a permanent magnet rotor; a molded face plate closes the other end of the opening and has a bearing for the other end of the shaft. The face plate has interfitting elements which locate it accurately with respect to the spool and cups on one side, and with respect to a head plate on the opposite side, assembly being facilitated by chamfered openings. The face plate and the head plate have bearings for the arbors of a train of reduction gears driven from a pinion on the rotor shaft. A single spring clip embracing the spool, cups and face plate engages the head plate and holds all the mentioned parts in assembled relation thereto. Assembly and disassembly can be done without tools.

22 Claims, 7 Drawing Figures

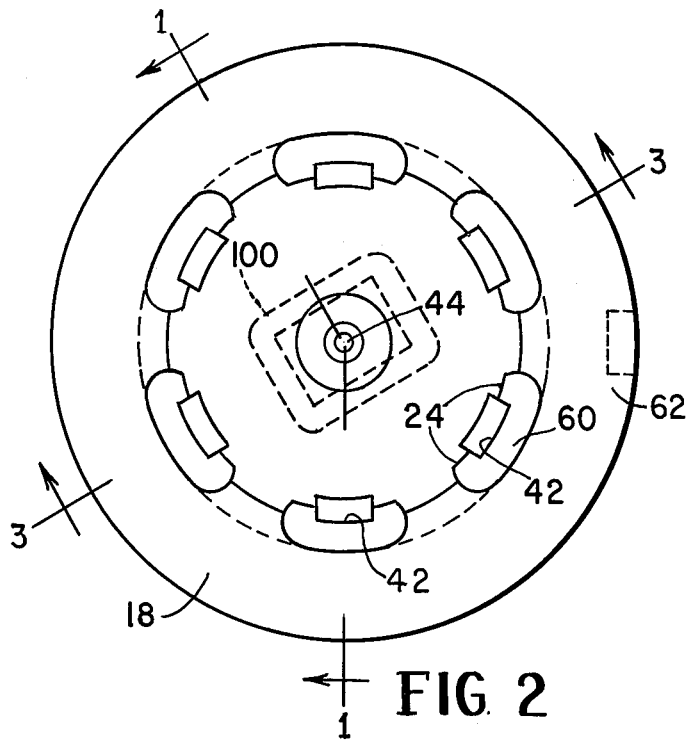
FIG. 2
FIG. 3
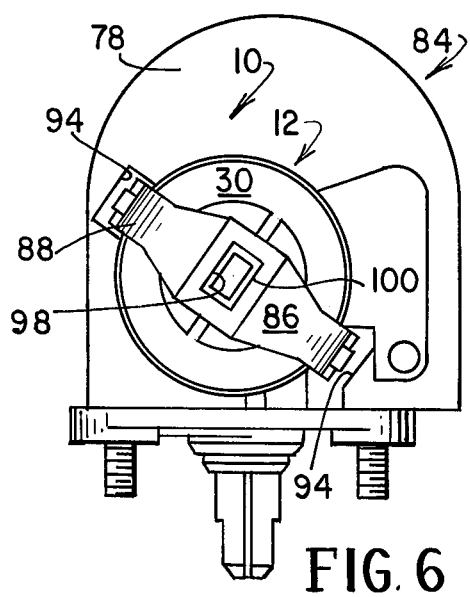
FIG. 6
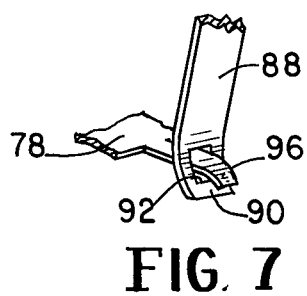
FIG. 7
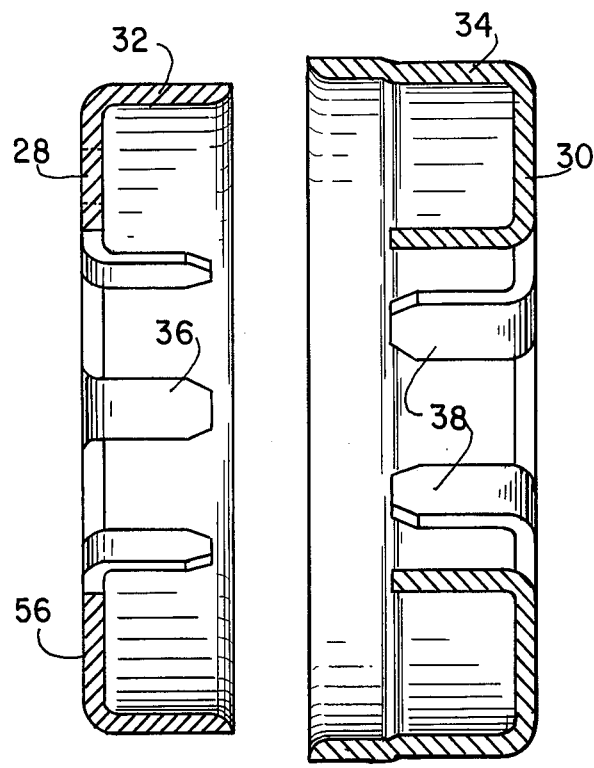
FIG. 4
FIG. 5

GEARED MOTOR ASSEMBLY

Synchronous motors, in sizes appropriate for driving clock movements, recording charts, sequence switches, operation timers, and the like, are well known. They commonly utilize a permanent magnet rotor, and a field structure which includes a toroidal field coil substantially enclosed by an iron casing with pole pieces extending into the space surrounding the rotor, in an orientation such that a high proportion of the magnetic flux through the air gaps between pole pieces is in a direction transverse to the axis of the rotor.

It is also common for such motors to be used by attachment to a train of reduction gears in such a way as to convert the rotational speed of the motor to some lower speed more suitable for the intended use.

It has, however, been customary to assemble the motors and the reduction gear units separately, each being held together by its own fastening means, and the motor and gear unit then being joined by yet a third set of fastenings.

It is an object of the present invention to provide a construction with a minimum number of parts which can be easily assembled by personnel without watchmaker skills (no adjustments being required) and in which the entire assembly of motor and reduction gearing is held in assembled relation by a single simple retaining device requiring no tools either for assembly or disassembly.

The invention comprises a geared motor assembly including a spool having an annular or toroidal field winding thereon and having an integral end wall with a bearing recess therein, a rotor, a shaft carrying the rotor, one end of the shaft being received in the bearing recess, and a face plate disposed adjacent the spool at the end thereof opposite the end wall, the face plate having a bearing thereon receiving the opposite end of the shaft. Chamfered entries are provided into the bearing recess in the end wall, and in the portion of the end plate through which the shaft passes, to facilitate assembly. The spool and the face plate have interfitting elements whereby they are accurately located with respect to each other, with respect to the axis of the shaft, and with respect to the distance between the bearing recess and the bearing in the face plate. A head plate is disposed adjacent the face plate on the side thereof opposite the spool, the face plate and the head plate having interfitting elements whereby they are accurately located with respect to each other. A plurality of gear and pinion elements are journalled in the face and head plates. A single retention device holds the spool, the rotor, the face plate, the gear and pinion elements and the head plate in assembled relation.

BRIEF DESCRIPTION OF THE DRAWINGS

FIG. 2 is a plan view of the coil spool member of the motor assembly, looking into the open end thereof;

FIG. 3 is a sectional view of the coil spool member, taken on the line 3—3 of FIG. 2;

FIG. 4 is a diametral sectional view of the inner field cup member;

FIG. 5 is a diametral sectional view of the outer field cup member;

FIG. 6 is an end elevational view of a digital clock with the geared motor assembly applied to it; and FIG. 7 is a fragmentary perspective view illustrating the engagement of the assembly clip with an appropriately formed tab on the head plate.

Figure 1:
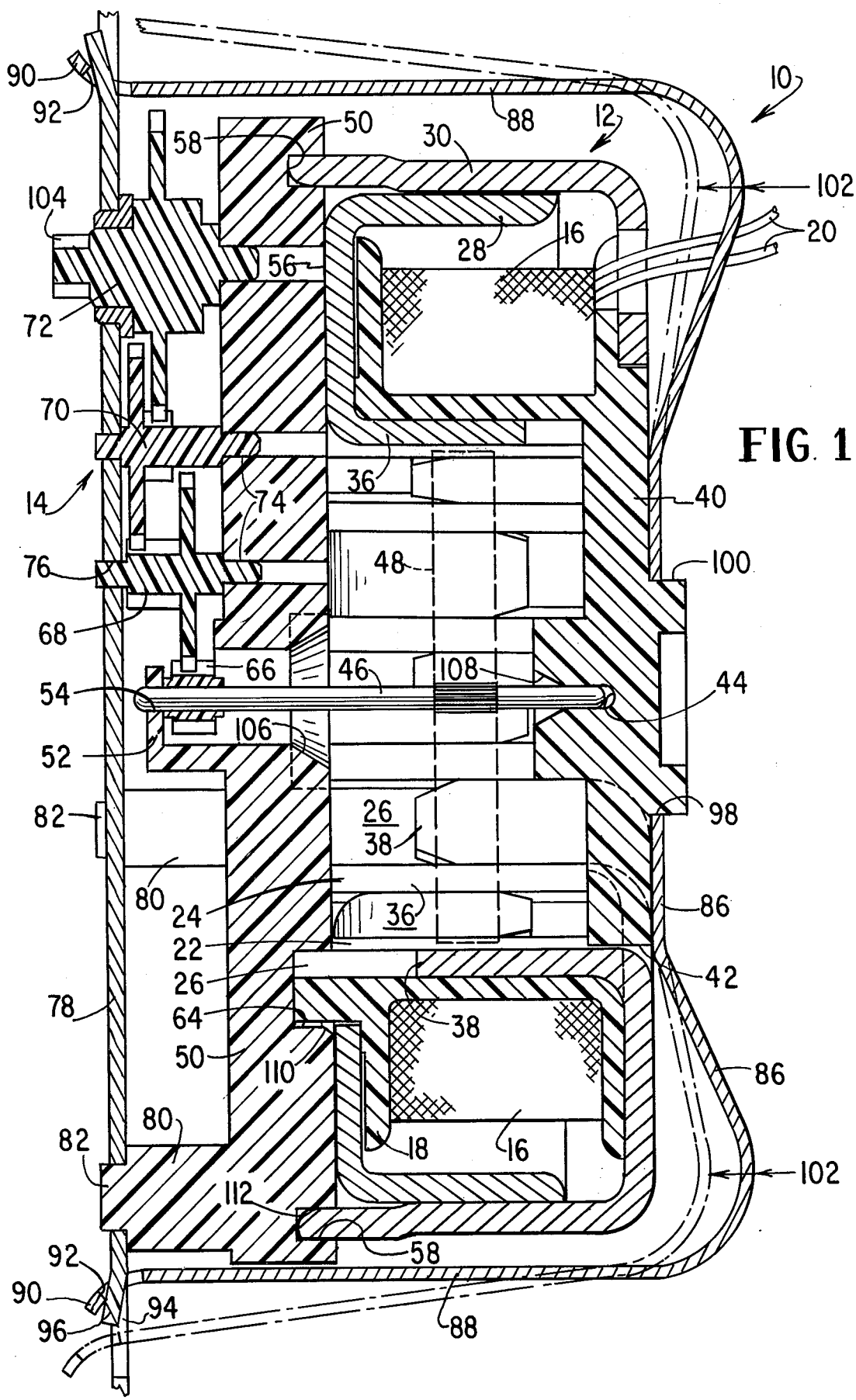
FIG. 1 is a diametral sectional view of the motor assembly taken as on the broken section line 1—1 of FIG. 2, so that the upper and lower halves of FIG. 1 show different aspects of the construction.

In the accompanying drawings, the geared motor assembly, indicated broadly by the reference numeral 10, comprises a synchronous motor indicated generally at 12, and a reduction gearing subassembly designated generally by the reference numeral 14.

The motor 12 has a field structure consisting of a field coil on a dielectric spool, and field members of magnetic material which surround the spool. The field coil 16 is wound on a spool 18 of dielectric material and is provided with terminal leads 20 for external connections. The spool has a central opening 22 which is formed with axially extending ribs or splines 24. The interspaces 26 between the ribs 24 constitute a series of axially extending slots, even in number, equally spaced, and arranged in a circle around the central opening 22 of the spool 18.

The spool is enclosed by an inner field cup 28 and an outer field cup 30, each made of metal of appropriate magnetic permeability. These cups are shown separately in FIGS. 4 and 5, and are shown in assembled relation in FIG. 1. The outer flanges 32 and 34 of the cups are dimensioned for an easy telescoping fit. The inner field cup 28 is formed with axially extending pole pieces 36, and the outer field cup 30 is formed with axially extending pole pieces 38. The pole pieces are dimensioned so that they enter into alternate slots 26 when the field cups are assembled around the coil spool. It will be noted that the pole pieces are formed from the central portion of the blank, rather than from the portion thereof lying radially outward from the pole piece diameter, as is common in prior art constructions. The construction illustrated herein has the advantage that no metal is removed from the magnetic path around the outside of the cup. When metal is so removed, as in prior art constructions, the reluctance of the path is necessarily increased, and this is undesirable.

One end of the central opening 22 in the spool 18 is closed by an end wall 40, which is provided with openings 42 as continuations of alternate slots 26, through which the pole pieces 38 of the outer field cup can pass.

By reason of the broken section line 1—1 (FIG. 2), FIG. 1 brings into the plane of illustration in its upper half a showing of the manner in which a pole piece 36 enters the central opening of the spool from one side thereof, and the lower half of FIG. 1 shows how a pole piece 38 enters the central opening 22 from the opposite side of the spool, through an opening 42.

The end wall 40 has a central recess 44 forming a bearing in which one end of a shaft 46 is received. This shaft carries a permanent magnet rotor in the form of a disk 48, which is shown in dotted outline in FIG. 1 in order not to obscure the showing of pole pieces 36 and 38 and the ribs 24 by which the orientation of the pole pieces is determined.

Opposite the end wall 40, a face plate 50 closes the central opening 22 of the coil spool. A bracket 52 on the face plate carries a bearing 54 for the outer end of the rotor shaft 46.

When the field cups are assembled, the outer flange 34 of the outer field cup 30 extends beyond the plane of the surface 56 of the inner field cup 28, and fits closely in an annular groove 58 in the face plate 50, thus accurately centering the field cups with respect to the face plate, and particularly with respect to the bearing 54.

On the coil spool 18 the ribs 24 lying on each side of the openings 42, and an intermediate part 60 (FIG. 2) are extended beyond the head 62 of the spool, and are received in corresponding recesses 64 (FIG. 1) in the face plate 50. Since the end wall 40 is an integral part of the coil spool 18, and the bracket 52 is an integral part of the face plate 50, the interfitting of the extended parts 24-60 of the spool in the recesses 64 of the face plate serves to assure accurate alignment of the bearing recess 44 and the bearing 54 for opposite ends of the rotor shaft 46, in an axial sense. Furthermore, the bottoming of the extended parts 24-60 in the recesses 64 assures a predetermined spacing of those bearings in an axial direction, thus eliminating any necessity, as encountered in prior art construction, for watchmaker adjustment of the bearings.

Shaft 46 carries a pinion 66 which drives a train of reduction gear and pinion elements 68, 70 and 72. These elements have reduced diameter portions at their ends, constituting arbors which are received in appropriately located bearing holes 74 in the face plate 50 and 76 in a head plate 78. A one-way mechanism of conventional ratchet type, not shown in the drawing, is customarily included in the reduction gearing subassembly 14, in view of the fact that a motor of this type may start in either direction.

Posts 80, formed as extensions of the face plate 50, have reduced ends 82 which fit in corresponding openings in the head plate 78, serving both to space the face plate and head plate at an appropriate distance, and to locate the plates accurately in transverse relation, so that the bearing holes for the gear and pinion elements are properly located in opposite pairs.

The head plate 78 may constitute one end of a drum-type digital clock display indicated generally at 84 in FIG. 6, where the geared motor assembly is shown attached to such a display as the drive means therefor.

The construction which has been described lends itself to a very simple attachment means, which is illustrated in FIGS. 1 and 6. A bowed spring clip 86 embraces the outer field cup 30, and has arms 88 extending toward the head plate 78. The ends of the arms each have an outwardly inclined portion 90 in which an opening 92 is formed. The head plate 78 has openings 94 through which the ends of the arms 88 can be passed so that their openings 92 can be hooked over downturned tab projections 96 on the head plate 78, as may be seen in FIG. 7.

The center portion 86 of the spring clip bears against the end wall 40 of the spool, and against portions of the outer field cup 30. When the ends of the spring are engaged with the projections 96, both the spool and the outer field cup are pressed toward the left in FIG. 1, so that their projecting portions are retained in the mating recesses 64 and 58. Likewise, the face plate 50 and the head plate 78 are retained in engagement, located by the fitting of reduced ends 82 on the posts 80 in their mating holes in head plate 78.

Thus the parts of the motor are held together, the parts of the reduction gearing subassembly are held together, the motor and the reduction gearing assembly are held in association with each other, and with the digital clock 84, or other driven member, all by the single retention device 86. No tools are required, either for assembly or disassembly. Disassembly can be done in the field, for replacement of any part, with no need for tools or fixtures.

To aid in orientation of the spring clip 86 so that it will fit readily over the projections 96, the clip is provided at its center with a rectangular opening 98 which fits around a boss 100 of corresponding shape on the end wall 40 of the spool. To apply the clip, it is simply necessary to fit its center opening over the boss 100, and to apply finger pressure at points 102 to move the arms 88 into the approximate position shown in dotted lines in FIG. 1. Pressure is then applied against the side arms, to cause the opening 92 to pass over the projection 94, when the pressure at 102 can be released, and the retaining spring is properly engaged. A reversal of this procedure, while pulling the side arm away from the outer field cup, permits disassembly.

When the geared motor assembly is used in conjunction with a digital clock display as shown in FIG. 6, or in other ways, for example to drive the chart of a recording instrument, or a time switch, engagement is made with the driven mechanism through the gear and pinion element 72, which extends through the head plate 78 with the pinion 104 on the left side thereof, as seen in FIG. 1.

Convenience and speed of assembly are facilitated also by other features. The conical entrance 106 to the opening by which the shaft 46 passes through the face plate, the conical entrance 108 to the bearing recess 44, and the provision of rounded ends on the shaft 46, assure that the rotor will not get caught at some undesired position at the time of assembly in the motor, regardless of which end is inserted in its bearing first. The recesses 64 are provided with chamfers 110 which aid in guiding the projections 60 into the recesses when the motor 12 and the gearing subassembly 14 are joined. The same joining is further aided by the rounded inner edge 112 on the field cup 30, which provides guidance of that edge into the groove 58.

A structure is thus provided which lends itself to quick, easy and economical assembly and fastening, and to correspondingly easy unfastening and disassembly, should that be necessary.

For example, if the geared motor assembly is used (as with a digital display 84) for an automobile clock, where wide variations in supply voltage are common, and where severe transient voltage conditions may be encountered if there is a loose connection to the storage battery, such a transient condition might cause burn-out of the field coil 16. With the structure which has been described, replacement is a relatively simple matter, and can be done by an automobile mechanic with no pretensions to watchmaker skills. The motor can be removed from the clock by simply pressing on the clip 86 at points 102, prying the arms 88 outwardly, and releasing the pressure at points 102. The motor 12 (and the gearing subassembly 14 if desired) can then be removed by disconnecting the lead wires 20, which are typically provided with simple slip fit terminals for attachment to the wiring harness of the automobile. With no need for tools, the field cups 28 and 30 can be separated, which leaves the field coil 16 and the spool 18 on which it is wound, and the rotor and shaft. The field coil and spool are a subassembly which are simply replaced by a new subassembly. The various parts are then reassembled, an operation which is facilitated by the chamfered entries 106 and 108, and similar features which have been described above. The motor 12 and gearing subassembly 14 are reattached to the clock display 84 by the clip 86.

Reconnection of the terminal leads 20 places the clock back in service.

It will thus be understood that the object of a geared motor which is easily assembled and simply retained has been provided in a form which can be economically manufactured.

That which is claimed is:

1. A geared motor assembly comprising a field structure having first alignment extensions; a rotor; a shaft carrying said rotor; a bearing for one end of said shaft carried by said field structure; a face plate having a bearing for the opposite end of said shaft, a plurality of first alignment recesses, and at least one second alignment extension; a head plate having at least one second alignment recess; a gear reduction assembly comprising a plurality of gear elements journalled in and between said face and head plates and driven by a pinion on said shaft; said first alignment extensions being within said first alignment recesses and said second alignment extensions being within said second alignment recesses for accurately positioning said field structure, said face plate, and said head plate with respect to each other; and a single retention member extending from said field structure to said head plate and holding said field structure, said face plate and said head plate in assembled relation.

2. A geared motor assembly in accordance with claim 1 wherein said field structure comprises a spool having an annular field winding thereon, said spool having an end wall integral therewith, said end wall having said bearing for said one end of said shaft formed therein.

3. A geared motor assembly in accordance with claim 2 wherein said bearing for said one end of said shaft is formed with a chamfered entrance.

4. A geared motor assembly in accordance with claim 2 wherein said spool and said face plate have interfitting elements whereby they are accurately located with respect to each other and with respect to the distance between said bearing recess and said bearing in said face plate.

5. A geared motor assembly in accordance with claim 2 wherein said face plate and said head plate have interfitting elements whereby they are accurately located with respect to each other.

6. A geared motor assembly in accordance with claim 1 wherein said field structure includes a pair of field members substantially enclosing an annular field coil, and wherein one of said members is arranged to telescopingly receive the other said member.

7. A geared motor assembly in accordance with claim 6 wherein said telescoping members have pole pieces integral therewith, formed from the central portions of said telescoping members, and bent to extend axially with respect to said rotor.

8. A geared motor assembly in accordance with claim 6 wherein at least one of said telescoping field members has a central opening of sufficient diameter to pass said rotor.

9. A geared motor assembly in accordance with claim 2 wherein said field structure also includes field members, an annular field coil substantially enclosed by said field members, said field members having pole pieces integral therewith, formed from the central portions of said field members and bent to extend axially with respect to said rotor, the pole pieces of one of said field members extending through openings in said end wall of said spool.

10. A geared motor assembly in accordance with claim 1 wherein said field structure includes two cup-shaped field members, the annular walls thereof being dimensioned for a telescoping fit, the outer one of said walls being further dimensioned to extend beyond the inner field member, and to be received in a groove in said face plate whereby the telescoped field members are located coaxially with respect to the bearing in said face plate for said shaft.

11. A geared motor assembly in accordance with claim 10 wherein said groove in said face plate is provided with chamfered edges.

12. A geared motor assembly in accordance with claim 1 wherein said bearing for said opposite end of said shaft is supported on said face plate above the side of said face plate opposite to said spool, said face plate having an opening therein through which said shaft passes, said opening being chamfered in the side of said face plate facing said spool.

13. A geared motor assembly comprising a spool having an annular field winding thereon and having an end wall integral therewith, said end wall having a bearing recess formed therein, a rotor, a shaft carrying said rotor, one end of said shaft being received in said bearing recess, a face plate disposed adjacent said spool at the end thereof opposite said end wall, said face plate having a bearing thereon receiving the opposite end of said shaft, said spool and said face plate having interfitting elements whereby they are accurately located with respect to each other, with respect to the axis of said shaft, and with respect to the distance between said bearing recess and said bearing in said face plate; a head plate disposed adjacent said face plate on the side thereof opposite said spool, said face plate and said head plate having interfitting elements whereby they are accurately located with respect to each other, a plurality of gear and pinion elements journalled in said face and head plates and driven by a pinion on said shaft, and a single retention device comprising a bowed spring engaging said head plate adjacent opposite ends of said face plate, and exerting pressure in an axial direction against said end wall of said spool for holding said spool, said rotor and shaft, said face plate, said gear and pinion elements and said head plate in assembled relation.

14. A geared motor assembly in accordance with claim 13 wherein said bearing recess in said end wall is formed with a chamfered entrance.

15. A geared motor assembly in accordance with claim 13 wherein the ends of said shaft are rounded.

16. A geared motor assembly in accordance with claim 13 further comprising telescoping field members and wherein said annular field winding is substantially enclosed within said telescoping field members.

17. A geared motor assembly in accordance with claim 16 wherein said telescoping members have pole pieces integral therewith, formed from the central portions of said telescoping members, and extending axially with respect to said rotor.

18. A geared motor assembly in accordance with claim 16 wherein at least one of said telescoping field members has a central opening of sufficient diameter to pass said rotor.

19. A geared motor assembly in accordance with claim 16 wherein the outer one of said telescoping field members is dimensioned to extend beyond the inner field member, and to be received in a groove in said face plate, whereby the telescoped field members are coaxially located with respect to the bearing on said face plate for said shaft.

20. A geared motor assembly in accordance with claim 19 wherein said outer telescoping field member extension is provided with a rounded edge.

21. A geared motor assembly in accordance with claim 13 wherein said bearing on said face plate for said shaft is supported on said face plate above the side of said face plate opposite said spool, said face plate having an opening therein through which said shaft passes, said opening being chamfered in the side of said face plate facing said spool.

22. A geared motor assembly comprising:
a field structure;
a rotor;
a shaft carrying said rotor;
a bearing for one end of said shaft carried by said field structure;
a face plate having a bearing for the opposite end of said shaft;
a head plate;
a gear element journalled in said face and head plates and driven by a pinion on said shaft; and
a single retention device comprising a bowed spring engaging said head plate adjacent opposite ends of said face plate, and exerting pressure in an axial direction against said field structure holding said field structure, said rotor and shaft, said face plate, said head plate and said gear element in assembled relation.

* * * * *